United States Patent [19]

Kordesch et al.

[11] 4,384,029
[45] May 17, 1983

[54] RECHARGEABLE GALVANIC ELEMENT

[75] Inventors: Karl Kordesch; Josef Gsellmann, both of Graz, Austria

[73] Assignee: Varta Batterie Aktiengesellschaft, Hanover, Fed. Rep. of Germany

[21] Appl. No.: 282,141

[22] Filed: Jul. 10, 1981

[30] Foreign Application Priority Data

Jul. 10, 1980 [DE] Fed. Rep. of Germany ....... 3026065

[51] Int. Cl.³ ............................................. H01M 4/50
[52] U.S. Cl. ..................................... 429/169; 429/224
[58] Field of Search ................. 429/169, 224, 94, 238, 429/239, 66, 206

[56] References Cited

U.S. PATENT DOCUMENTS

| | | | |
|---|---|---|---|
| 3,116,172 | 12/1963 | Wilke et al. | 429/238 |
| 3,716,411 | 2/1973 | Ogawa et al. | 429/224 |
| 4,091,178 | 5/1978 | Kordesch | 429/224 |
| 4,268,689 | 5/1981 | Tamminen | 429/224 |

FOREIGN PATENT DOCUMENTS

| | | | |
|---|---|---|---|
| 55-119343 | 9/1980 | Japan | 429/66 |
| 1384030 | 2/1975 | United Kingdom | 429/224 |

Primary Examiner—Donald L. Walton
Attorney, Agent, or Firm—Weiser, Stapler & Spivak

[57] ABSTRACT

A rechargeable galvanic element with constant-volume positive manganese dioxide electrode. In a rechargeable galvanic element having an alkaline electrolyte and a positive manganese dioxide electrode the volumetric change of the electrode body caused by phase transformation, which entails undesired contact losses, is largely prevented by exertion of a steady pressure upon the electrode surfaces. For a concentric electrode arrangement, this can be done with particular effectiveness. For example, the pre-pressed $MnO_2$ electrode can be forced into a rigid cylindrical metal cage, while the annular slot enclosed by the housing cup, lid and bottom insulation is occupied by the zinc electrode. In other cases, continuous take-off contact is preferable, using pressure springs or tensioned metal mesh which extend over the flat electrodes.

7 Claims, 9 Drawing Figures

RECHARGEABLE GALVANIC ELEMENT

The invention relates to a rechargeable galvanic element having a positive manganese dioxide electrode and an aqueous alkaline electrolyte.

Manganese dioxide electrodes in alkaline electrolytes such as KOH or NaOH can be recharged if the oxidation step of the three-valued manganese is not exceeded during discharge. For example, the electrochemically active $\gamma$-$MnO_2$ reduces in homogeneous phase to the similarly structured $\alpha$-MnO(OH). For even smaller oxygen contents, phases are formed which have a different crystalline structure ($\gamma$-$Mn_3O_4$, $Mn(OH)_2$). A correspondingly deeply discharged manganese dioxide electrode can be recharged only one to three times.

Thus the reversibility of the $MnO_2$-Zn System is limited to the region $MnO_2$ to approximately $MnO_{1.6}$. In view of this, in commercial $MnO_2$-Zn cells, the discharge is limited either by control of the potential which must not fall below 0.9 V, or by an underdimensioning of the dischargeable zinc quantity. Thus, German patent publication (Auslegeschrift) 1,771,292 describes an alkaline $MnO_2$-Zn cell in which the discharge capacity of the negative electrode is less than 40% of the actual capacity of the positive electrode.

By such means, a cell can reach 100 or more cycles, depending upon current density, discharge steps, and permissible discharge end potential.

The full reversibility of $\gamma$-$MnO_2$, in the region in which it is rechargeable, is impeded by other obstacles of chemical or physical character. For example, a side reaction to manganate can not be excluded. Above all, however, it has been found that the mass mix consisting of manganese dioxide and graphite swells and that the cathode body expands during discharge. This causes the resistance of the electrode to increase. As a result, a progressive worsening is observed during electrical operation. In this connection, reference is made to "Batteries", Vol. 1, pages 281-290, by K. V. Kordesch (published by Marcel Dekker Inc., New York, 1974). In addition, it has already been attempted to achieve better cohesion of the electrode mass by means of binders such as cement (U.S. Pat. No. 2,962,540), graphitized textile fibers (U.S. Pat. No. 2,977,401), or latex (U.S. Pat. No. 3,113,050).

A more far-reaching measure for preventing the decomposition of the electrode during electrical cycling and to prevent its tendency to swell in the electrolyte takes the form, in accordance with U.S. Pat. No. 3,945,847, of using an supplemental binder, in addition to a binding means which is made conductive by the incorporation of colloidal graphite. Its task is to essentially assure the solidity of the electrode. It can consist of polymers or co-polymers of such materials as, for example, styrene, butadiene, acrylonitrile, urea, formaldehyde, vinyl alcohol, or epoxy resins. It is to be wettable by the electrolyte. However, experience has shown that, despite the improvement in cohesion which is thereby achieved, the cathode potential decreases significantly even after a few cycles during extraction of equal current quantities (Ah).

Accordingly, it is an object of the invention to create conditions in which the discharge and charge characteristic of manganese dioxide electrodes in alkaline electrolytes remains unchanged over an extended period of operation.

This and other objects which will appear are achieved in accordance with the invention by mounting the manganese dioxide electrode inside the element in such a manner that its volume remains constant during discharge and charging.

The techniques embodying the invention are based on the recognition that it is not sufficient to compensate for the worsening of conductivity which necessarily accompanies the expansion tendency of the electrode by the creation of additional contact points, or to replace the usual manganese dioxide-graphite mix by a plastic-bound electrode material. Also take-off contacting by means of a grid, on a flat cathode surface, for example, has proven inadequate.

Rather it has been found that the desired reversibility or cycling number of the manganese dioxide electrode can only be achieved by the continuous action of a positive pressure upon its surfaces. In contrast, the potential lifetime of conventional elements with pressed or extruded manganese dioxide electrodes, but which are not subject to expansion limiting and are not under mount pressure, are capable of far fewer cycles. This mount pressure can be between about 20–500 $N/cm^2$ (newton per square centimeter). At a mount pressure of 20 $N/cm^2$, the possible cycling capacity amounts to about fifty cycles, whereas the potential lifetime span of conventional elements with pressed manganese dioxide electrodes amounts at most to five cycles. With further increase of the mount pressure substantially higher life spans can be achieved. For example, at a mount pressure of 100 $N/cm^2$, the life span is approximately 100 cycles.

In a preferred embodiment of the invention the compression is achieved by closely surrounding with a rigid metal cage the electrode body in the galvanic cell which has, if desired, been pre-compressed. A concentric arrangement is particularly adapted for effective prevention of expansion of the electrodes.

Such an arrangement indeed favors pressure increase during discharge (expansion) of the cathode, and is sufficiently flexible to again permit the volume reduction which takes place during subsequent charging but which is somewhat less than the volume increase, without loss of contact.

In accordance with another characteristic of the invention, the required volume limitation and continuity of the electrical contact to the electrode can also be provided by means of a spring force.

Both of these ways of exerting pressure upon the electrode within the scope of the invention are described in what follows by means of several examples. Reference should also be made to the accompanying drawings wherein FIG. 1 shows an expansion limiting arrangement for concentrically positioned $MnO_2$ electrodes, in the form of an annular cylinder in FIG. 1a, and in the form of a solid cylinder in FIG. 1b.

Figure 1A:
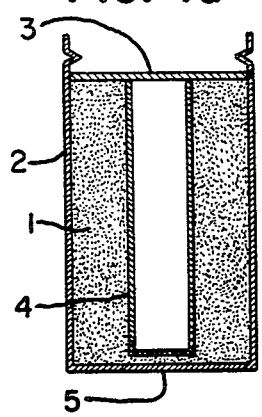

Referring now to the drawings, in FIG. 1a the electrode 1 consisting of $MnO_2$ and graphite in the shape of an annular cylinder is so enclosed that the housing cup 2 with lid 3 forms its outer rigid boundary and a metallic hollow cylinder 4 concentrically positioned within housing cup 2 forms its internal boundary. The hollow cylinder 4 is perforated and can be welded to the bottom 5 of housing cup 2. In its interior there may be positioned, for example, a zinc electrode with its separator. The perforation of the hollow cylinder 4 exhibits approximately 9 holes per cm$^2$, the hole diameter being about 2 mm.

During cell production the mass mix is pressed into the annular slot between housing cup 2 and metal cylinder 4 at a pressure of 100–200 bar.

Figure 1B:
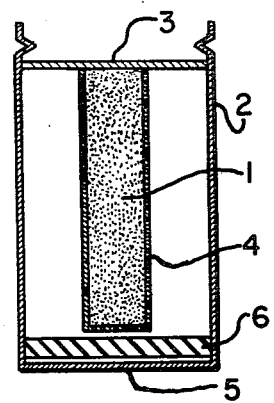

As an alternative to the foregoing arrangement, shown in FIG. 1b, the metal cylinder can define the cage for a concentric MnO$_2$ electrode, while the zinc occupies the annular gap. In that instance, an insulating plate 6 has to separate the metal cylinder 4 with the cathode mass 1 from the bottom 5 of housing cup 2. Current take-off takes place in conventional manner (not shown) by means of a central contact arrangement, for example a rivet at the bottom or a vane at the top.

Figure 2A:
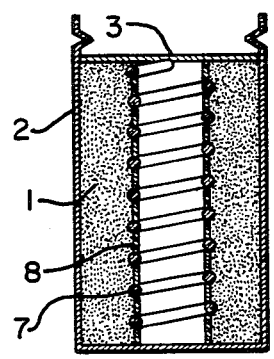
FIG. 2 shows an annular cylindrical electrode in FIG. 2a, which may if desired be built up of separate components, as shown in elevation cross-section in FIG. 2b and in top view in FIG. 2c, and whose expansion is prevented by spring loading.

FIG. 2a shows an electrode 1 similar to that in FIG. 1a, namely a unitary annular cylindrical pressed body, which can be made in an extruder, for example. By means of a spiral spring 7 the electrode, which is provided internally with a porous cover foil 8, is subjected to a compressive force. The spiral spring 7 can be welded to the bottom 5 or at the upper end to the housing cup 2.

Figure 2B:
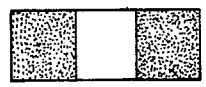
Figure 2C:
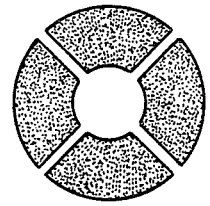

FIGS. 2b and 2c show the possibility of constructing the electrode body of individual rings or ring segments.

What is important is that the spring force counteract the expansion, and the contact loss attributable to layer-like flaking off during cycling of the cathode.

Figure 3A:
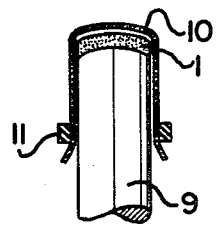
FIGS. 3a and 3b show expansion preventing mounts for an electrode which is flat in shape.
Figure 3B:
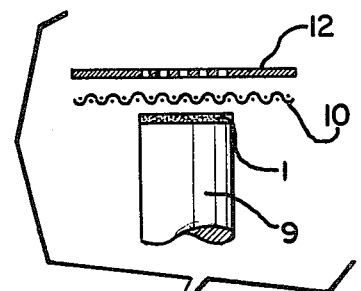

In FIG. 3a there is shown an MnO$_2$-graphite electrode 1 which is positioned upon a slightly bowed support 9. Contact is provided by a metal grid 10, which is tensioned by means of clamp 11, and which cooperates with support 9 to prevent expansion of electrode 1. In FIG. 3b a pressure plate 12 insures fixed positioning of the electrode. The several elements are shown slightly separated in FIG. 3b for better visibility.

Figure 4:
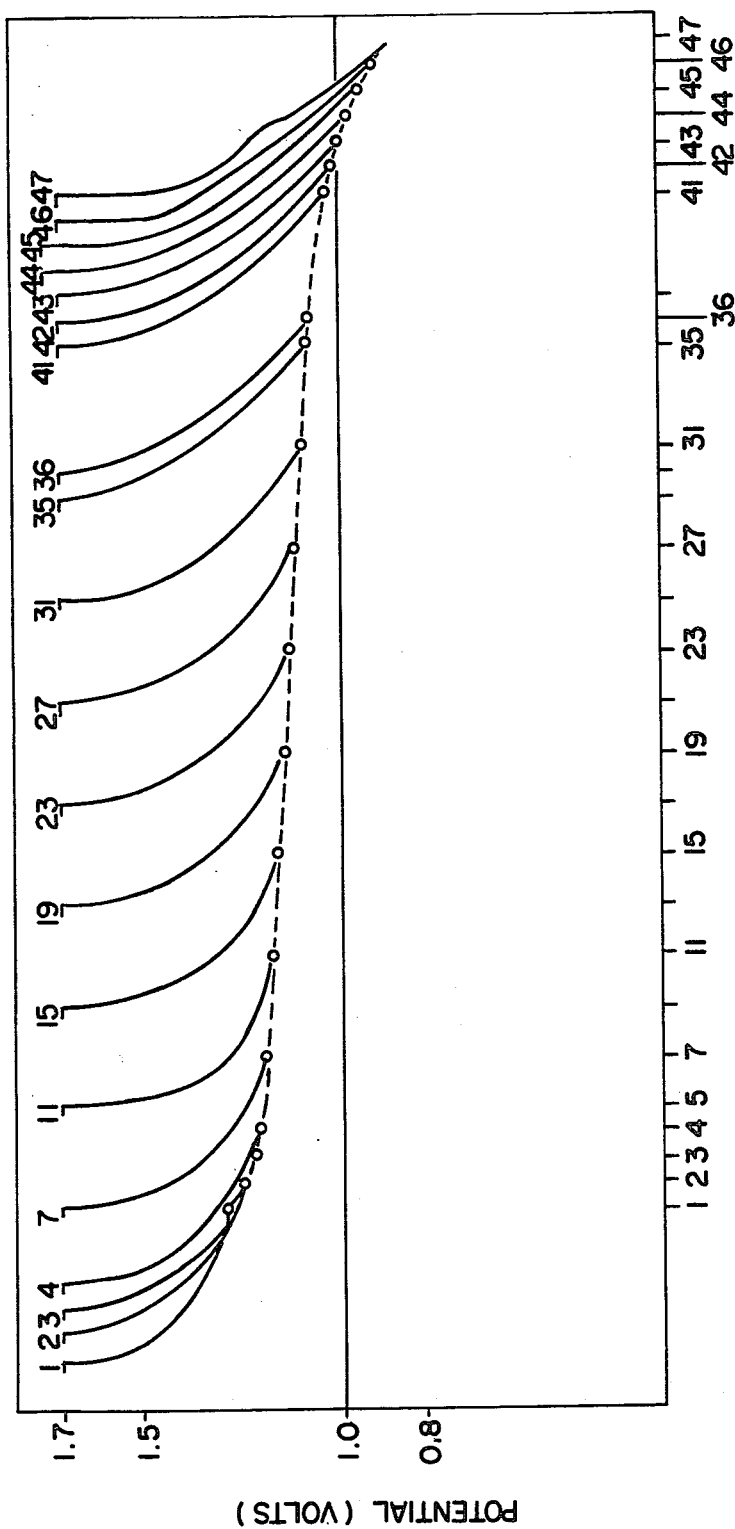
FIGS. 4 and 5 show discharge curves for cathodes subjected to pressure.
Figure 5:
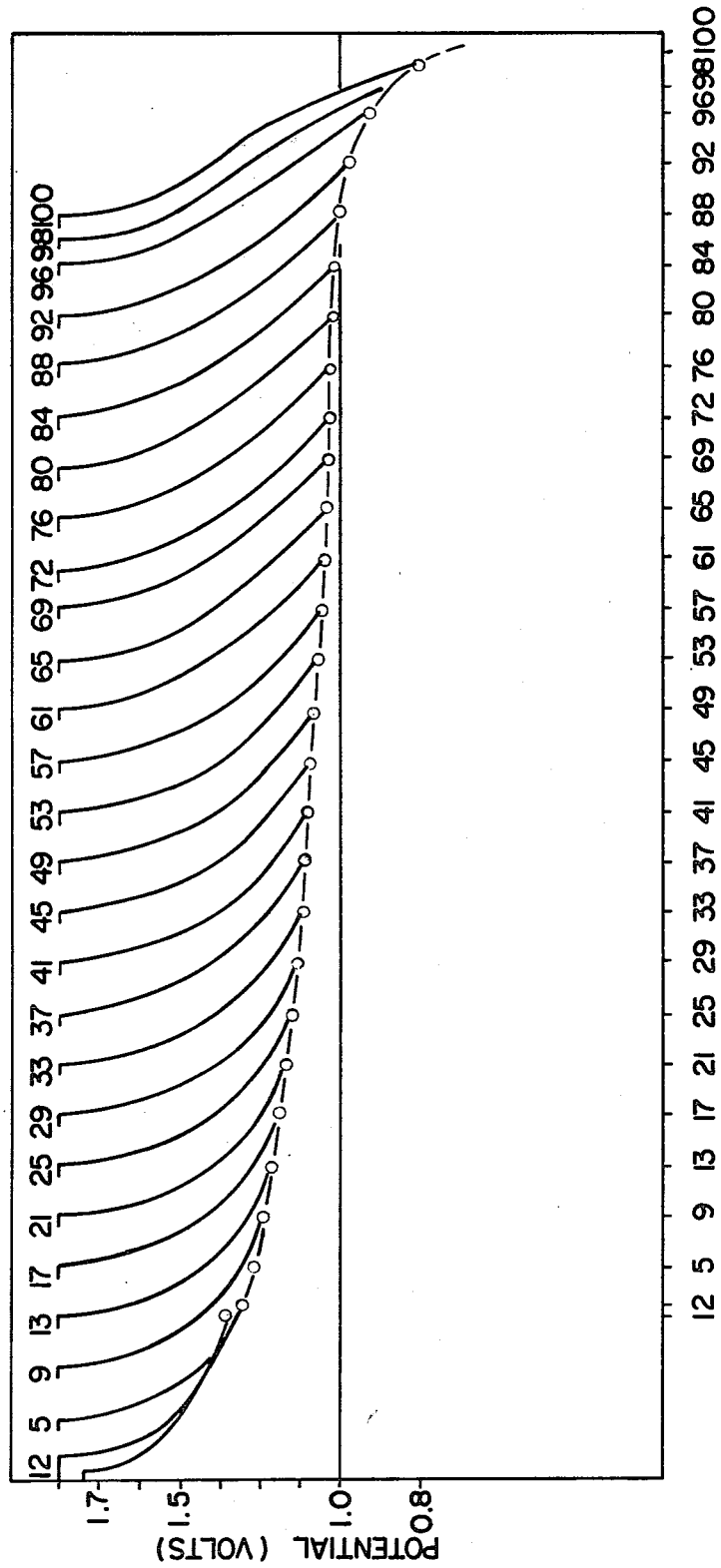

FIGS. 4 and 5 illustrate the good reproduceability of discharge curves and the effect of a positive pressure. The positive pressure was produced by a test set-up like that shown in FIG. 3b. The rod 9 is pressed, together with the manganese dioxide electrode 1 positioned thereon, with controllable pressure against a fixed perforated plate 12 and a fine screen 10.

The numerals in FIGS. 4 and 5 denote the respective cycles, the discharge duration of the individual cycles being sixty minutes. By increasing the pressure from the 20 N/cm$^2$ in FIG. 4 to 500 N/cm$^2$ in FIG. 5, a number of cycles is achieved which is more than 100% greater. Without the use of pressure, only about 5 to 10 cycles are obtained, and these exhibit drastically decreasing capacity.

We claim:

1. A rechargeable galvanic element having a positive manganese dioxide electrode and an aqueous alkaline electrolyte, said electrode having a tendency to swell during discharge, said element comprising
means for mounting the manganese dioxide electrode within the element in such manner that its volume does not increase during discharge.

2. The element of claim 1 wherein the manganese dioxide electrode is pre-compressed and is surrounded by a rigid metal cage which prevents its expansion during discharge.

3. The galvanic element of claim 2 wherein the manganese dioxide electrode is in the form of an annular cylinder, the outer confining portion of the metal cage being formed by the housing cup and lid of the element, and the internal confining portion being provided by means of a hollow metal cylinder.

4. The galvanic element of claim 2 wherein the manganese dioxide electrode takes the form of an annular cylinder, the outer confining part of the metal cage being formed by the housing cup and lid, and the internal confining portion being provided by a porous foil which is put under pressure in the shape of a cylinder by means of a spiral spring sufficiently strongly to prevent swelling during discharge.

5. The galvanic element of claim 1 wherein the manganese dioxide electrode is subjected to a mount pressure of at least 20 N/cm$^2$.

6. The galvanic element of claim 1 wherein the manganese dioxide electrode is subjected to a mount pressure of about 100 N/cm$^2$.

7. The galvanic element of claim 1 wherein
the mounting means is constructed so as to exert increasing pressure against the electrode during discharge sufficient to resist said tendency to swell and maintain the electrode volume substantially constant both during charging and discharging.

* * * * *